US006516884B1

(12) United States Patent
Chatterji et al.

(10) Patent No.: US 6,516,884 B1
(45) Date of Patent: Feb. 11, 2003

(54) STABLE WELL CEMENTING METHODS AND COMPOSITIONS

(75) Inventors: Jiten Chatterji, Duncan, OK (US); Roger S. Cromwell, Walters, OK (US); Bobby J. King, Duncan, OK (US); Darrel C. Brenneis, Marlow, OK (US); Ronald J. Crook, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/201,171

(22) Filed: Jul. 23, 2002

(51) Int. Cl.$^7$ ............................................. E21B 33/138
(52) U.S. Cl. ......................... 166/294; 166/285; 175/72
(58) Field of Search ................................ 166/292–295, 166/285; 175/72; 106/724, 696, 823

(56) References Cited

U.S. PATENT DOCUMENTS

| | | | |
|---|---|---|---|
| 4,452,950 A | 6/1984 | Wideman | 525/339 |
| 4,537,918 A | 8/1985 | Parcevaux et al. | 523/130 |
| 4,767,460 A | 8/1988 | Parcevaux et al. | 524/6 |
| 5,130,354 A * | 7/1992 | Gelles | 524/68 |
| 5,135,577 A | 8/1992 | Brothers | 106/724 |
| 5,159,980 A | 11/1992 | Onan et al. | 166/294 |
| 5,293,938 A | 3/1994 | Onan et al. | 166/293 |
| 5,346,011 A | 9/1994 | Onan et al. | 166/291 |
| 5,389,706 A | 2/1995 | Heathman et al. | 524/5 |
| 5,483,986 A | 1/1996 | Onan et al. | 137/1 |
| 5,588,488 A | 12/1996 | Vijn et al. | 166/293 |
| 5,688,844 A | 11/1997 | Chatterji et al. | 524/8 |
| 5,738,463 A | 4/1998 | Onan | 405/154 |
| 5,791,380 A | 8/1998 | Onan et al. | 138/149 |
| 5,795,924 A | 8/1998 | Chatterji et al. | 523/130 |
| 5,820,670 A | 10/1998 | Chatterji et al. | 106/727 |
| 5,913,364 A | 6/1999 | Sweatman | 166/281 |
| 5,945,387 A | 8/1999 | Chatterji et al. | 507/224 |
| 5,964,293 A | 10/1999 | Chatterji et al. | 166/294 |
| 6,098,711 A | 8/2000 | Chatterji et al. | 166/294 |
| 6,167,967 B1 | 1/2001 | Sweatman | 166/281 |
| 6,234,251 B1 | 5/2001 | Chatterji et al. | 166/295 |
| 6,258,757 B1 | 7/2001 | Sweatman et al. | 507/219 |
| 6,271,181 B1 | 8/2001 | Chatterji et al. | 507/219 |
| 6,328,106 B1 | 12/2001 | Griffith et al. | 166/295 |
| 6,330,917 B2 | 12/2001 | Chatterji et al. | 166/295 |
| 6,401,817 B1 | 6/2002 | Griffith et al. | 166/295 |

OTHER PUBLICATIONS

H1186, Gelles, "Self–Adhesive Water Proofing Product," May 1993.*

* cited by examiner

Primary Examiner—David Bagnell
Assistant Examiner—Zakiya Walker
(74) Attorney, Agent, or Firm—Craig W. Roddy; C. Clark Dougherty, Jr.

(57) ABSTRACT

The present invention provides stable well cementing methods and compositions for sealing subterranean zones penetrated by well bores. The improved thermally stable and degradation resistant well cement compositions are basically comprised of a hydraulic cement, sufficient water to form a pumpable slurry, an aqueous hydrogenated styrene-butadiene rubber latex and a latex stabilizer present in an amount sufficient to stabilize the hydrogenated styrene-butadiene latex.

22 Claims, 2 Drawing Sheets

STABLE WELL CEMENTING METHODS AND COMPOSITIONS

BACKGROUND OF THE INVENTION

1. Field of the Invention

The present invention relates to stable well cementing methods and compositions, and more particularly, to such methods and well cement compositions which are thermally stable and degradation resistant.

2. Description of the Prior Art

Hydraulic cement compositions are commonly utilized in oil, gas and water well completion and remedial operations. For example, hydraulic cement compositions are used in primary cementing operations whereby strings of pipe such as casings and liners are cemented in well bores. In performing primary cementing, a hydraulic cement composition is pumped into the annular space between the walls of a well bore and the exterior surfaces of a string of pipe disposed therein. The cement composition is permitted to set in the annular space thereby forming an annular sheath of hardened, substantially impermeable cement therein. The cement sheath physically supports and positions the pipe in the well bore and bonds the pipe to the walls of the well bore whereby the undesirable migration of fluids between zones or formations penetrated by the well bore is prevented.

When conventional cement compositions are utilized for sealing pipe strings in well bores or for carrying out other remedial or repair procedures in high temperature wells including geothermal wells, the conventional cement compositions are unstable after setting due to settling of the particulate solids in the cement composition and suffer from strength degradation due to exposure to the high temperatures, corrosion and the like.

Thus, there are needs for improved cementing methods and compositions which are thermally stable and degradation resistant.

SUMMARY OF THE INVENTION

The present invention provides improved methods of sealing subterranean zones penetrated by well bores and improved thermally stable and degradation resistant well cement compositions which meet the above described needs and overcome the deficiencies of the prior art. The methods of the present invention basically comprise the following steps. An improved thermally stable and degradation resistant cement composition is provided comprised of a hydraulic cement, sufficient water to form a pumpable slurry, an aqueous hydrogenated styrene-butadiene rubber latex and a latex stabilizer present in an amount sufficient to stabilize the hydrogenated styrene-butadiene latex. The cement composition is placed in a subterranean zone to be cemented and thereafter, the cement composition is allowed to set into a hard, impermeable, thermally stable and degradation resistant mass.

The improved thermally stable and degradation resistant well cement compositions of this invention are basically comprised of a hydraulic cement, sufficient water to form a pumpable slurry, an aqueous hydrogenated styrene-butadiene rubber latex and a latex stabilizer present in an amount sufficient to stabilize the hydrogenated styrene-butadiene latex.

The hydrogenated styrene-butadiene rubber utilized in the aqueous latex thereof has in the range of from about 80% to about 95% of the available carbon valence bonds attached to separate other atoms. The weight ratio of styrene to butadiene in the hydrogenated styrene-butadiene rubber is in the range of from about 5:95 to about 95:5. The presence of the hydrogenated styrene-butadiene rubber in the cement composition provides improved thermal stability at high temperatures as well as improved strength and corrosion degradation resistance at high temperatures.

The objects, features and advantages of the present invention will be apparent to those skilled in the art upon a reading of the description of preferred embodiments which follows.

DESCRIPTION OF PREFERRED EMBODIMENTS

Figure 1:
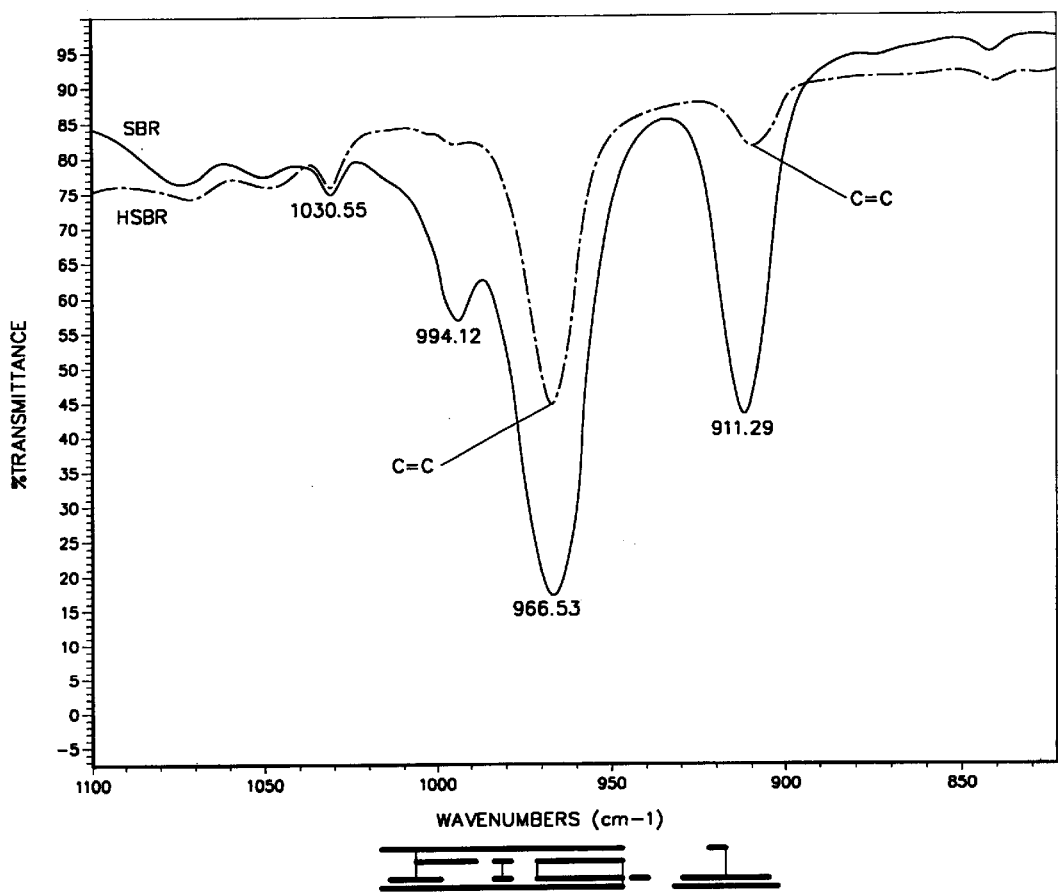
FIG. 1 shows the reduction of styrene-butadiene rubber by observation of the percent transmittance of the carbon-carbon double bonds.

Improved methods for sealing subterranean zones penetrated by well bores having high temperatures, i.e., temperatures up to and including 700° F., are provided by the present invention. The methods utilize improved thermally stable and degradation resistant cement compositions for sealing the subterranean zones. In accordance with the methods, an improved thermally stable and degradation resistant cement composition of this invention is provided, the cement composition is placed in the subterranean zone to be sealed and the cement composition is allowed to set into a hard impermeable mass therein.

The improved thermally stable and degradation resistant cement compositions of this invention are basically comprised of a hydraulic cement, sufficient water to form a pumpable slurry, an aqueous hydrogenated styrene-butadiene rubber latex and a latex stabilizer present in an amount sufficient to stabilize the hydrogenated styrene-butadiene latex.

Aqueous lattices of styrene-butadiene rubber and latex stabilizers have heretofore been utilized in well cement compositions to cause quick setting of the cement compositions and to inhibit pressurized formation fluid channeling in the cement compositions. As described further hereinbelow, the present invention utilizes an aqueous latex of hydrogenated styrene-butadiene rubber with a latex stabilizer to provide very high temperature stability to a well cement composition, i.e., stability at temperatures in the range of from about 80° F. to about 700° F. The cement compositions of this invention also have excellent strength and corrosion degradation resistance at high temperatures whereby they are suitable for use in high temperature wells including geothermal wells.

A variety of hydraulic cements can be utilized in accordance with the present invention including those comprised of calcium, aluminum, silicon, oxygen and/or sulfur which set and harden by reaction with water. Such hydraulic cements include Portland cements, slag cements, pozzolana cements, gypsum cements, aluminous cements and silica cements. Portland cements or their equivalents are generally preferred for use in accordance with the present invention. Portland cements of the types defined and described in the API Specification For Materials And Testing For Well Cements, API Specification 10, 5th Edition, dated Jul. 1, 1990 of the American Petroleum Institute are particularly suitable. Preferred such API Portland cements include classes A, B, C, G and H, with API classes G and H being preferred.

The water utilized to form the cement compositions of this invention can be fresh water, unsaturated salt solutions or saturated salt solutions including brine and seawater. Generally, water from any source can be utilized so long as it doesn't adversely react with components of the cement compositions. The water is generally included in the cement compositions of this invention in an amount in the range of from about 35% to about 60% by weight of hydraulic cement therein.

The aqueous hydrogenated styrene-butadiene rubber latex utilized in accordance with this invention is included in the cement composition in a general amount in the range of from about 8% to about 52% by weight of hydraulic cement in the composition, more preferably in an amount of from about 17% to about 26% by weight of hydraulic cement.

The hydrogenated styrene-butadiene rubber in the aqueous latex has in the range of from about 80% to about 95% of the available carbon atom valence bonds attached to separate other atoms, more preferably, the hydrogenated styrene-butadiene rubber has in the range of from about 90% to about 95% of the available carbon atom valence bonds attached to separate other atoms. The weight ratio of styrene to butadiene in the hydrogenated styrene-butadiene rubber is preferably in the range of from about 5:95 to about 95:5. The most preferred hydrogenated styrene-butadiene rubber has a weight ratio of styrene to butadiene of about 30:70. The hydrogenated styrene-butadiene rubber is present in the aqueous latex thereof in an amount in the range of from about 25% to about 75% by weight of the aqueous latex, more preferably in an amount of from about 30% to about 70%.

In order to prevent the aqueous rubber latex from prematurely coagulating and increasing the viscosity of the cement compositions, an effective amount of a latex stabilizer is included in the cement compositions. Latex stabilizers are comprised of one or more surfactants which function to prevent latex coagulation. Examples of rubber latex stabilizing surfactants which can be utilized in the cement compositions include, but are not limited to, surfactants having the formula R—Ph—O(OCH$_2$CH$_2$)$_m$OH wherein R is an alkyl group having from about 5 to about 30 carbon atoms, Ph is phenyl and m is an integer of from about 5 to about 50 and surfactants having the formula R$_1$(R$_2$O)$_n$SO$_3$X wherein R$_1$ is an alkyl group having from about 5 to about 20 carbon atoms, R$_2$ is the group —CH$_2$—CH$_2$—, n is an integer from about 10 to about 40 and X is a cation. Of the various latex stabilizing surfactants which can be utilized, a sodium salt of an ethoxylated (15 moles or 40 moles) C$_{15}$ alcohol sulfonate having the formula H(CH$_2$)$_{15}$(CH$_2$CH$_2$O)$_{15}$SO$_3$Na is preferred. The rubber latex stabilizing surfactant utilized is included in the cement composition in an amount in the range of from about 10% to about 25% by volume of the aqueous rubber latex therein, more preferably in an amount of about 15%.

As is well understood by those skilled in the art, a variety of cement composition additives can be included in the cement compositions of this invention including, but not limited to, defoamers, set retarders, dispersants, strength retrogression preventing materials, weighting materials, suspending agents and the like.

As mentioned above, the improved thermally stable and degradation resistant well cement compositions of this invention are basically comprised of a hydraulic cement, sufficient water to form a pumpable slurry, an aqueous hydrogenated styrene-butadiene rubber latex and a latex stabilizer present in an amount sufficient to stabilize the hydrogenated styrene-butadiene latex. The aqueous hydrogenated styrene-butadiene rubber latex provides high thermal stability to the cement compositions, i.e., the cement compositions set at temperatures as high as 70° F. and remain stable and strength and corrosion degradation resistant at such temperatures. In addition, the presence of the aqueous hydrogenated styrene-butadiene rubber latex prevents fluid loss from the cement compositions prior to setting and forms a rubber layer on the surfaces of the cement compositions after setting which contributes to the prevention of strength and corrosion degradation.

A preferred method of the present invention for sealing a subterranean zone penetrated by a well bore is comprised of the steps of: (a) providing an improved thermally stable and degradation resistant cement composition comprised of Portland cement, sufficient water to form a pumpable slurry, an aqueous hydrogenated styrene-butadiene rubber latex present in an amount in the range of from about 8% to about 52% by weight of hydraulic cement in the composition and a latex stabilizer present in an amount sufficient to stabilize the hydrogenated styrene-butadiene latex; (b) placing the cement composition in the subterranean zone; and (c) allowing the cement composition to set into a hard impermeable mass.

Another preferred method of this invention for sealing a subterranean zone penetrated by a well bore comprises the steps of: (a) providing an improved thermally stable and degradation resistant cement composition comprised of Portland cement, sufficient water to form a pumpable slurry, an aqueous hydrogenated styrene-butadiene rubber latex containing styrene-butadiene rubber having in the range of from about 80% to about 95% of the available carbon atom valence bonds attached to separate other atoms present in the cement composition in an amount in the range of from about 8% to about 52% by weight of hydraulic cement in the composition and a latex stabilizer present in an amount sufficient to stabilize the hydrogenated styrene-butadiene latex; (b) placing the cement composition in the subterranean zone; and (c) allowing the cement composition to set into a hard impermeable mass.

A preferred improved thermally stable and degradation resistant well cement composition comprises: Portland cement; sufficient water to form a pumpable slurry; an aqueous latex of hydrogenated styrene-butadiene rubber latex present in an amount in the range of from about 8% to about 52% by weight of hydraulic cement in the composition; and a latex stabilizer present in an amount sufficient to stabilize the hydrogenated styrene-butadiene latex.

Another preferred improved thermally stable and degradation resistant well cement composition comprises: Portland cement; sufficient water to form a pumpable slurry; an aqueous hydrogenated styrene-butadiene rubber latex having in the range of from about 80% to about 95% of the available carbon atom valence bonds attached to separate other atoms present in an amount in the range of from about 8% to about 52% by weight of hydraulic cement in the composition; and a latex stabilizer present in an amount sufficient to stabilize the hydrogenated styrene-butadiene latex.

In order to further illustrate the methods and compositions of this invention, the following examples are given.

EXAMPLE I

Hydrogenated styrene-butadiene rubber (HSBR) latex was prepared using styrene-butadiene rubber (SBR) latex containing 25% styrene and 75% butadiene in accordance with the method described in the Polymeric Encyclopedia, Vol. 3, pgs. 20–46 (1995) as follows.

To 200 grams of SBR latex (50% active) was added 1.52 moles (48.58 grams) of hydrazine and 5.52×10$^{-5}$ mole of copper sulfate pentahydrate (0.0138 grams). Prior to the addition of the hydrazine and copper sulfate, the pH of the SBR latex was raised to 10 by the addition of potassium hydroxide. The resulting mixture was heated to 131° F. and held at that temperature. Once the mixture maintained a steady temperature of 131° F., 1.52 moles (120 grams) of hydrogen peroxide was very slowly added to the mixture with vigorous agitation. The addition was complete in approximately 2 hours as indicated by the lack of evolution of nitrogen gas. The progress of the reduction (addition of hydrogen) of the SBR latex was followed by observing the % transmittance of the carbon-carbon double bonds at wave lengths of 966.53 cm$^{-1}$ and 911.29 cm$^{-1}$ as shown in FIG. 1. The substantial decrease in double bonds shown in FIG. 1 indicate the extent of the reduction.

EXAMPLE II

Various cement compositions were prepared which included the HSBR or the SBR latexes described in Example I as well as Class H Portland cement, water and various other additives as indicated in Table I below.

temperatures ranging from 80° F. to 292° F. were comparable. However, a significant departure was noted when the temperature was raised to 420° F. The composition containing SBR latex (Composition No. 5) gave a fluid loss of 92 cc/30 min. as compared to the cement composition containing HSBR latex (Composition No. 6) which gave a fluid loss of 34 cc/30 min. As shown in Table II, the thickening time of the various compositions were comparable.

TABLE III

Compressive Strength Test Results

| Composition No. | Temperature, ° F. | Curing Time, hours | Compressive Strength, psi |
|---|---|---|---|
| 3 | 80 | 72 | 954 |
| 4 | 80 | 72 | 971 |

TABLE I

Cement Compositions Containing SBR Latex Or HSBR Latex and Additives

| Composition No. | Density, lb/gal | Portland Cement Class | Water, % by wt. of cement | SBR Latex[1], % by wt. of cement | Latex Stabilizer[2], % by wt. of cement | Defoamer[3], % by wt. of cement | Set Retarder, % by wt. of cement | Dispersant[8], % by wt. of cement | HSBR Latex[9], % by wt. of cement | Strength Retrogression Preventing Material, % by wt. of cement | Weighting Material[12], % by wt. of cement | Suspending Agent[13], % by wt. of cement |
|---|---|---|---|---|---|---|---|---|---|---|---|---|
| 1 | 16.4 | H | 17.7 | 17.7 | 1.8 | 0.009 | 0.1[4] | 1.5 | | | | |
| 2 | 16.4 | H | 8 | | 1.8 | 0.009 | 0.1[4] | 1.5 | 34 | | | |
| 3 | 18.5 | H | 31.9 | 17.7 | 2.7 | 0.007 | 3.2[5] | 1.5 | | 35[11] | 60 | |
| 4 | 18.5 | H | 16.5 | | 2.8 | | 10.7[5] | 1.5 | 27.2 | 35[11] | 60 | |
| 5 | 18.3 | H | 28.4 | 26.6 | 2.8 | | 1.9[6] & 0.8[7] | | | 17.5[10] & 17.5[11] | 60 | 0.5 |
| 6 | 18.3 | H | 0 | | 5.7 | | 1.9[6] & 0.8[7] | | 51.1 | 17.5[10] & 17.5[11] | 60 | 0.5 |

[1]SBR Latex (50% active)
[2]Sodium salt of ethoxylated (15 moles) of $C_{15}$ alcohol sulfonate
[3]Silicone defoamer
[4]Sulfomethylated lignosulfonate
[5]A mixture of calcium lignosulfonate and gluconic acid
[6]Tartaric acid
[7]Copolymer of acrylic acid and 2-acrylamido-2-methyl propane sulfonic acid
[8]Naphthalene sulfonate condensed with formaldehyde
[9]HSBR Latex (25% active)
[10]Crystalline silica
[11]Silica flour
[12]Iron oxide
[13]Hydroxypropylguar The fluid loss, thickening times and compressive strengths of the cement compositions shown in Table I were determined in accordance with the above mentioned API Specification 10. The results of the tests are given in Tables II and III below.

TABLE II

Fluid Loss And Thickening Time Test Results

| Composition No. | Temperature, ° F. | Fluid Loss, cc/30 min | Thickening Time, hr:min |
|---|---|---|---|
| 1 | 190 | 30 | 4:30 |
| 2 | 190 | 22 | 6:07 |
| 3 | 292 | 15 | 3:53 |
| 4 | 292 | 10 | 5:38 |
| 5 | 420 | 92 | — |
| 6 | 420 | 34 | — |

From Table II it can be seen that the fluid loss control of the test cement compositions at bottom hole circulating

TABLE III-continued

Compressive Strength Test Results

| Composition No. | Temperature, ° F. | Curing Time, hours | Compressive Strength, psi |
|---|---|---|---|
| 3 | 450 | 72 | 532 |
| 4 | 450 | 72 | 1076 |

From Table III it can be seen that at a curing time of 80° F., no significant differences in the compressive strengths of the compositions containing either SBR latex or HSBR latex were noted. However, at 450° F., the composition containing SBR latex had a compressive strength which was approximately one-half of the compressive strength of the composition containing HSBR latex. This clearly indicates that the compositions containing the HSBR latex can withstand higher temperatures for longer periods of time than the compositions containing the SBR latex. That is, the composition including the HSBR latex can be utilized at very high temperatures without fear of cement sheath failure.

EXAMPLE III

Figure 2:
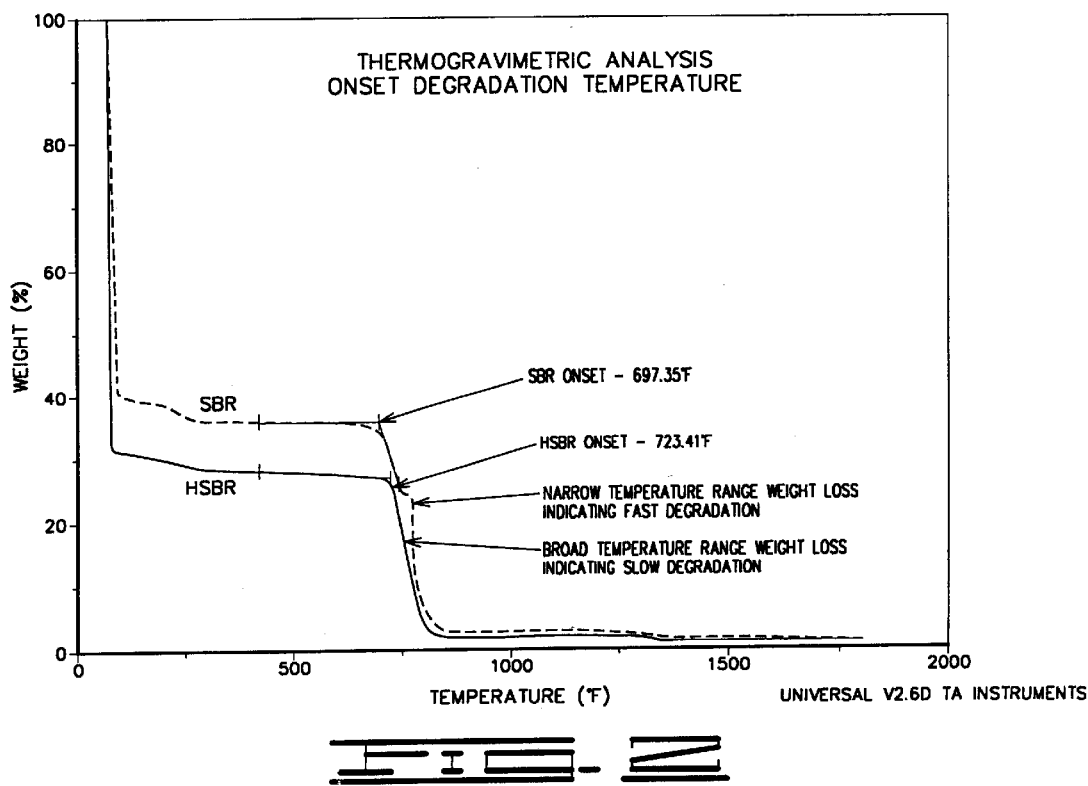
FIG. 2 shows the onset of thermal degradation of styrene-butadiene rubber and hydrogenated (reduced) styrene-butadiene rubber.

FIG. 2 shows the results of a thermogravimetric analysis of cement compositions numbers 3 and 4 set forth in Table I above containing SBR latex and HSBR latex, respectively. As shown in FIG. 2, the composition containing SBR latex has a higher percentage of degradation per degree at 697° F. compared to the composition containing HSBR latex at 723° F. Thus, cement compositions containing HSBR latex are thermally more stable than cement compositions containing SBR latex and will withstand higher temperatures.

EXAMPLE IV

Figure 3:
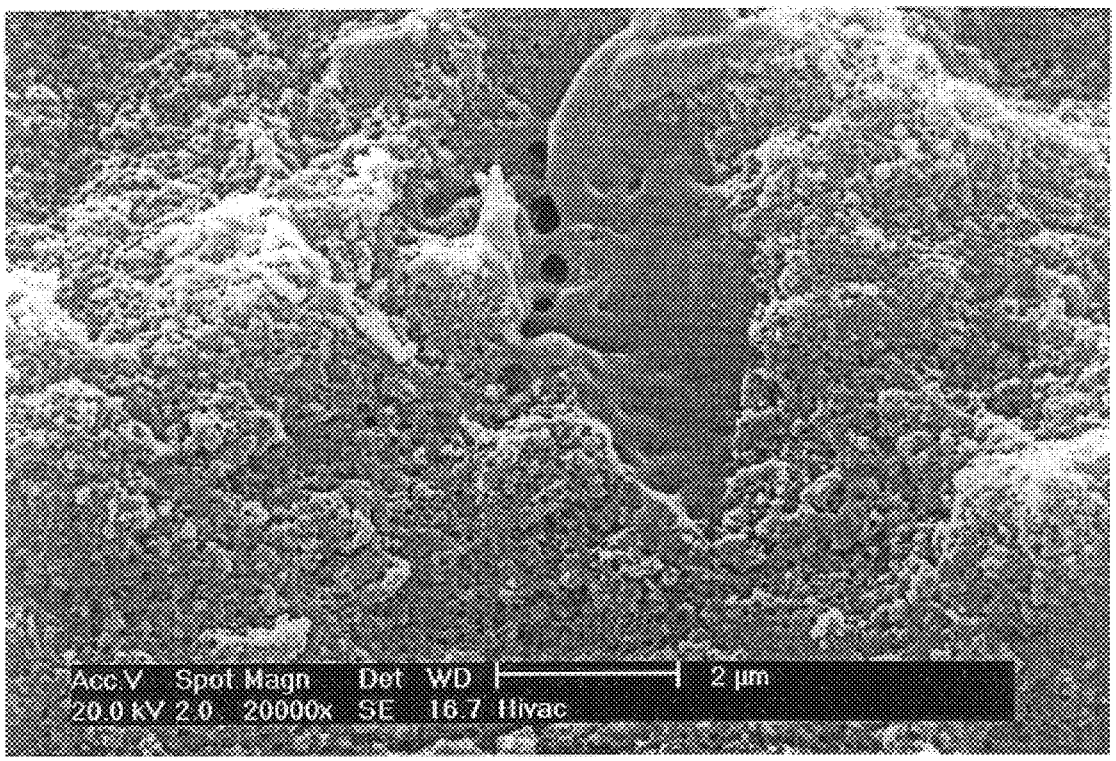
FIG. 3 shows a scanning electron microscope photograph of crushed set cement containing hydrogenated styrene-butadiene rubber.
Figure 4:
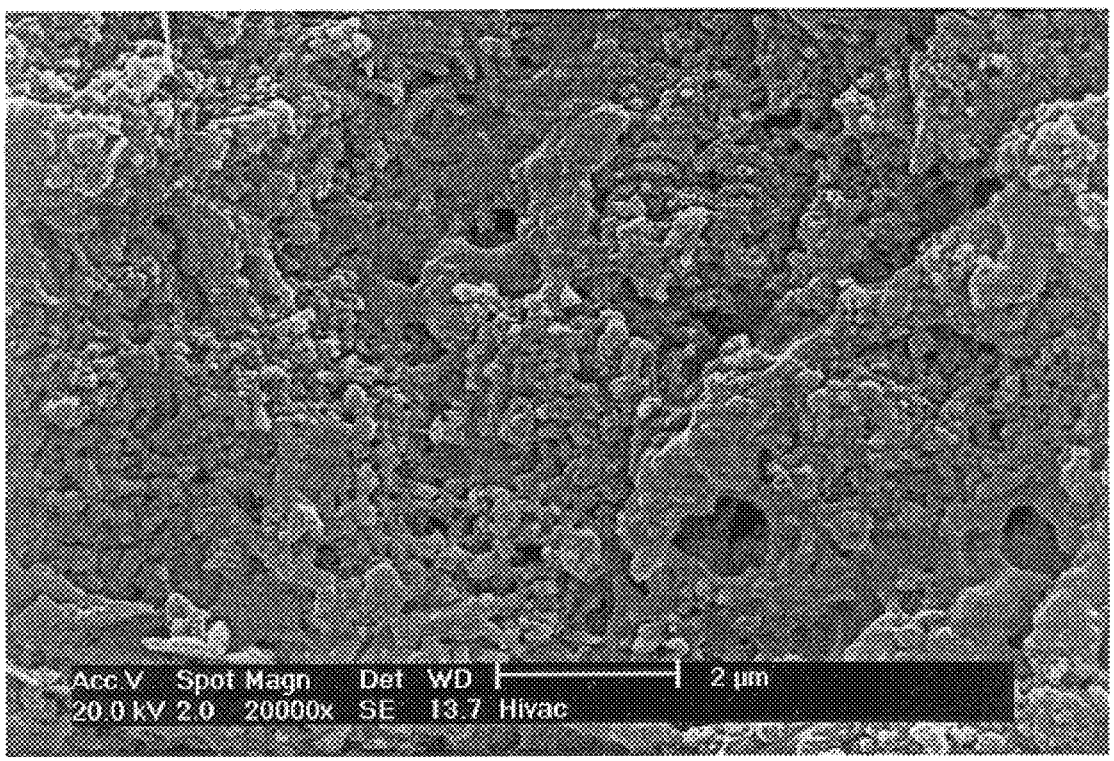
FIG. 4 shows a scanning electron microscope photograph of crushed cement containing styrene-butadiene rubber.

The cement compositions Numbers 5 and 6 set forth in Table I above containing the same concentration of SBR latex and HSBR latex, respectively, were cured at 600° F. for 7 days in an autoclave under a pressure of 3,000 psi. The cured samples were crushed and examined by an environmental scanning electron microscope and the photographs produced are shown in FIGS. 3 and 4. The photograph of FIG. 3 is of the cured cement composition containing HSBR latex. The photograph of FIG. 4 shows the cured cement composition containing SBR latex. As shown in FIG. 3, the crushed cement composition containing HSBR latex shows an extensive rubbery film in the composition. FIG. 4 which shows the crushed cement composition containing SBR latex shows a significant loss of the rubbery film as compared to FIG. 3.

An elemental analysis of the crushed cement compositions containing the SBR latex and HSBR latex was carried out by energy dispersive X-ray. The results of the analysis are shown in Table IV.

TABLE IV

Elemental Analysis Of Cured Cement Compositions Containing SBR and HSBR Latexes

| Element | Cement Composition No. 5 Containing SBR Latex, % by Weight | Cement Composition No. 6 Containing HSBR Latex, % by Weight |
|---|---|---|
| Carbon | 11.18 | 25.75 |
| Oxygen | 23.05 | 20.40 |
| Aluminum | 1.49 | 0.91 |
| Silicon | 23.12 | 22.36 |
| Calcium | 37.93 | 29.28 |
| Iron | 3.23 | 1.30 |
| TOTAL | 100.00 | 100.00 |

As shown in Table IV, the carbon content in Composition No. 6 containing HSBR latex was 25.75% by weight as compared to an 11.8% by weight carbon in Composition No. 5 containing SBR latex. This further indicates that cement compositions containing HSBR latex are more thermally stable than cement compositions containing SBR latex.

Thus, the present invention is well adapted to carry out the objects and advantages mentioned as those which are inherent therein. While numerous changes may be made by those skilled in the art, such changes are encompassed within the spirit of this invention as defined by the appended claims.

What is claimed is:

1. A method of sealing a subterranean zone penetrated by a well bore comprising the steps of:
   (a) providing an improved thermally stable and degradation resistant cement composition comprised of a hydraulic cement, sufficient water to form a pumpable slurry, an aqueous hydrogenated styrene-butadiene rubber latex and a latex stabilizer present in an amount sufficient to stabilize said hydrogenated styrene-butadiene latex;
   (b) placing said cement composition in said subterranean zone; and
   (c) allowing said cement composition to set into a hard impermeable mass.

2. The method of claim 1 wherein said aqueous hydrogenated styrene-butadiene rubber latex is present in an amount in the range of from about 8% to about 52% by weight of hydraulic cement in said composition.

3. The method of claim 1 wherein said hydrogenated styrene-butadiene rubber in said aqueous latex has in the range of from about 80% to about 95% of the available carbon atom valence bonds attached to separate other atoms.

4. The method of claim 1 wherein the weight ratio of styrene to butadiene in said hydrogenated styrene-butadiene rubber in said aqueous latex is in the range of from about 5:95 to about 95:5.

5. The method of claim 1 wherein the weight ratio of styrene to butadiene in said hydrogenated styrene-butadiene rubber in said aqueous latex is about 30:70.

6. The method of claim 1 wherein said hydraulic cement is selected from the group consisting of Portland cements, slag cements, pozzolana cements, gypsum cements, aluminous cements and silica cements.

7. The method of claim 1 wherein said hydraulic cement is Portland cement.

8. The method of claim 1 wherein said water is selected from the group consisting of fresh water, unsaturated salt solutions and saturated salt solutions.

9. The method of claim 1 wherein said water is present in said cement composition in an amount in the range of from about 35% to about 60% by weight of hydraulic cement therein.

10. The method of claim 1 wherein said hydrogenated styrene-butadiene rubber is present in said aqueous latex in an amount in the range of from about 25% to about 75% by weight of said aqueous latex.

11. The method of claim 1 wherein said latex stabilizer is the sodium salt of an ethoxylated $C_{15}$ alcohol sulfonate.

12. The method of claim 1 wherein said latex stabilizer is present in said cement composition in an amount in the range of from about 10% to about 25% by volume of the aqueous rubber latex therein.

13. A method of sealing a subterranean zone penetrated by a well bore comprising the steps of:
   (a) providing an improved thermally stable and degradation resistant cement composition comprised of a hydraulic cement, sufficient water to form a pumpable slurry, an aqueous hydrogenated styrene-butadiene rubber latex having in the range of from about 80% to about 95% of the available carbon atom valence bonds attached to separate other atoms present in an amount in the range of from about 8% to about 52% by weight of hydraulic cement in said composition and a latex stabilizer present in an amount sufficient to stabilize said hydrogenated styrene-butadiene latex;
   (b) placing said cement composition in said subterranean zone; and
   (c) allowing said cement composition to set into a hard impermeable mass.

14. The method of claim 13 wherein the weight ratio of styrene to butadiene in said hydrogenated styrene-butadiene rubber in said aqueous latex is in the range of from about 5:95 to about 95:5.

15. The method of claim 13 wherein the weight ratio of styrene to butadiene in said hydrogenated styrene-butadiene rubber in said aqueous latex is about 30:70.

16. The method of claim 13 wherein said hydraulic cement is selected from the group consisting of Portland cements, slag cements, pozzolana cements, gypsum cements, aluminous cements and silica cements.

17. The method of claim 13 wherein said hydraulic cement is Portland cement.

18. The method of claim 13 wherein said water is selected from the group consisting of fresh water, unsaturated salt solutions and saturated salt solutions.

19. The method of claim 13 wherein said water is present in said cement composition in an amount in the range of from about 35% to about 60% by weight of hydraulic cement therein.

20. The method of claim 13 wherein said hydrogenated styrene-butadiene rubber is present in said aqueous latex in an amount in the range of from about 25% to about 75% by weight of said aqueous latex.

21. The method of claim 13 wherein said latex stabilizer is the sodium salt of an ethoxylated $C_{15}$ alcohol sulfonate.

22. The method of claim 13 wherein said latex stabilizer is present in said cement composition in an amount in the range of from about 10% to about 25% by volume of the aqueous rubber latex therein.

* * * * *